(12) United States Patent
Morita et al.

(10) Patent No.: US 7,879,442 B2
(45) Date of Patent: Feb. 1, 2011

(54) COMPOSITE OF VAPOR GROWN CARBON FIBER AND INORGANIC FINE PARTICLE AND USE THEREOF

(75) Inventors: Toshio Morita, Kanagawa (JP); Chiaki Sotowa, Kanagawa (JP); Ryuji Yamamoto, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 510 days.

(21) Appl. No.: 10/571,700

(22) PCT Filed: Sep. 15, 2004

(86) PCT No.: PCT/JP2004/013859

§ 371 (c)(1),
(2), (4) Date: Mar. 13, 2006

(87) PCT Pub. No.: WO2005/026430

PCT Pub. Date: Mar. 24, 2005

(65) Prior Publication Data

US 2007/0031666 A1 Feb. 8, 2007

Related U.S. Application Data

(60) Provisional application No. 60/505,621, filed on Sep. 25, 2003.

(30) Foreign Application Priority Data

Sep. 16, 2003 (JP) .............................. 2003-322752

(51) Int. Cl.
*B32B 5/16* (2006.01)
*D02G 3/00* (2006.01)
*H01M 4/58* (2010.01)

(52) U.S. Cl. .................. 428/372; 428/402.24; 428/403; 428/364; 428/397; 429/218.1

(58) Field of Classification Search .................. 428/357, 428/372, 368, 367, 408, 447.1, 447.2, 447.7, 428/297, 397, 902, 402.24, 403; 427/180, 427/203, 206, 249.2, 249.4
See application file for complete search history.

(56) References Cited

U.S. PATENT DOCUMENTS 4,637,925 A 1/1987 Hiramatsu et al.
5,409,775 A * 4/1995 Harada et al. ................ 428/367
6,103,373 A * 8/2000 Nishimura et al. ........... 428/368
6,489,026 B1 12/2002 Nishimura et al.
6,558,841 B1 * 5/2003 Nakagiri et al. ........... 429/218.1
2003/0091891 A1 * 5/2003 Yoshida et al. ................ 429/44
2004/0247872 A1 * 12/2004 Sudo et al. ............. 428/402.24

FOREIGN PATENT DOCUMENTS

| EP | 1 588 385 B1 | 5/2008 |
|---|---|---|
| JP | 57-117623 A | 7/1982 |
| JP | 60-27700 A | 2/1985 |
| JP | 60-54998 A | 3/1985 |
| JP | 61-12967 A | 1/1986 |
| JP | 61-119767 A | 6/1986 |
| JP | 62-176662 A | 8/1987 |
| JP | 63-283750 A | 11/1988 |
| JP | 1-124680 A | 5/1989 |
| JP | 1-183577 A | 7/1989 |
| JP | 3-54199 A | 3/1991 |
| JP | 3-227325 A | 10/1991 |
| JP | 4-149242 A | 5/1992 |
| JP | 4-150089 A | 5/1992 |
| JP | 09-147916 | * 11/1995 |
| JP | 2778434 B2 | 5/1998 |
| JP | 2000-96429 A | 4/2000 |
| JP | 2001-200096 A | 7/2001 |
| JP | 2002-266170 A | 9/2002 |
| JP | 2003-20527 A | 1/2003 |
| WO | WO 00/58536 A1 | 10/2000 |

OTHER PUBLICATIONS

Patent Abstracts of Japan for JP 61-119767, of Jun. 6, 1986.

* cited by examiner

*Primary Examiner*—D. Lawrence Tarazano
*Assistant Examiner*—Altrev C Sykes
(74) *Attorney, Agent, or Firm*—Sughrue Mion, PLLC

(57) ABSTRACT

The present invention relates to a composite of vapor grown carbon fiber and inorganic fine particles comprising vapor grown carbon fiber, each fiber filament of the carbon fiber having a structure with hollow space extending along its axis, a diameter of 0.001 to 1 μm and an aspect ratio of 5 to 15,000; and inorganic fine particles having a particle size of 0.0001 to 5 μm, the particles being deposited onto the surface of the carbon fiber, wherein the ratio of the average diameter of the vapor grown carbon fiber to the average particle size of the inorganic fine particles is 1 0.01 to 1:5; the ratio by mass of the vapor grown carbon fiber to the inorganic fine particles is 1:0.005 to 1:50; and the carbon crystal structure of the carbon fiber is maintained and the surface characteristics are modified.

15 Claims, No Drawings

COMPOSITE OF VAPOR GROWN CARBON FIBER AND INORGANIC FINE PARTICLE AND USE THEREOF

CROSS REFERENCE TO THE RELATED APPLICATIONS

This is an application filed pursuant to 35 U.S.C. section 111(a) with claiming the benefit of U.S. Provisional application Ser. No. 60/505,621 filed Sep. 25, 2003 under the provision of 35 U.S.C. Section 111(b), pursuant to 35 U.S.C. Section 119(e)(1).

TECHNICAL FIELD

The present invention relates to a composite formed of vapor grown carbon fiber and inorganic fine particles and to use thereof. Particularly, the present invention relates to a composite formed by depositing inorganic fine particles onto the surface of vapor grown carbon fiber, in which characteristics of the carbon fiber surface are modified; and to a composite of vapor grown carbon fiber and inorganic fine particles in which the vapor grown carbon fiber serves as a support supporting the inorganic fine particles (hereinafter the composite may be abbreviated as a "vapor grown carbon fiber/inorganic fine particle composite").

BACKGROUND ART

In the case where vapor grown carbon fiber having developed carbon crystals is mixed with resin or other materials to form a composite, wettability of the carbon fiber to a matrix such as resin is a critical factor. When the vapor grown carbon fiber exhibits poor wettability to the matrix, the carbon fiber is difficult to disperse uniformly in the matrix and carbon fibers or vapor grown carbon fibers form aggregates isolated from one another in the matrix. Meanwhile, the surface of vapor grown carbon fiber in which carbon crystals are developed is inactive, and therefore the carbon fiber surface is not susceptible to a coupling agent or an additive.

In an attempt to modify the surface of carbon fiber or vapor grown carbon fiber, a variety of surface oxidation processes have been proposed. Typical examples of the processes are (1) acid treatment process making use of nitric acid or sulfuric acid, (2) air oxidation process, and (3) ozone oxidation process (see Japanese Laid-Open Patent Publication (kokai) No. 61-12967, Japanese Laid-Open Patent Publication (kokai) No. 2000-96429, and Japanese Laid-Open Patent Publication (kokai) No. 61-119767). In recent years, a process such as treating the surface of carbon fiber with fluorine in a plasma atmosphere has also been performed (see Japanese Laid-Open Patent Publication (kokai) No. 3-227325).

A functional group such as a carboxyl group, a carbonyl group, a hydroxyl group, or a similar group is introduced into the surface carbon layer of the carbon fiber after the oxidation treatment, and thus the carbon fiber surface becomes active. Therefore, the carbon fiber surface can be further modified by causing a coupling agent and the like to act on such a functional group in the surface ("Tanso Sen-i" ("Carbon fiber") authored by Otani, Kindai Henshu Ltd. (1972)).

DISCLOSURE OF THE INVENTION

In a conventional method of introducing a functional group into the surface of vapor grown carbon fiber by the oxidation treatment, characteristics of the carbon fiber surface are improved. However, oxidation of the carbon fiber surface may disrupt the carbon crystal structure; the carbon crystal structure which contributes to eliciting original physical properties of the vapor grown carbon fiber, including strength, electrical conductivity and thermal conductivity.

Accordingly, an object of the present invention is to provide a composite of vapor grown carbon fiber and inorganic fine particles whose surface characteristics are modified without disruption of the carbon crystal structure of the carbon fiber.

The present inventors have found that when inorganic fine particles exhibiting various characteristics are deposited onto the surface of vapor grown carbon fiber to form a composite, the surface of the carbon fiber can be modified so as to exhibit desired characteristics, and that when such a composite is formed by means of a physical (mechanical) technique; i.e., by means of the mechanochemical method, composite is readily formed as compared with the case where a conventional solvent dispersion method is employed, and disruption of the crystal structure of the carbon fiber surface is suppressed, whereby the resultant composite exhibits excellent characteristics. The present inventors have also found that when a composite is formed by means of the mechanochemical method from vapor grown carbon fiber and inorganic fine particles capable of being used as a catalyst and the like, the carbon fiber can be used as a support for the inorganic fine particle catalyst. The present invention has been accomplished on the basis of these findings.

Accordingly, the present invention provides a vapor grown carbon fiber/inorganic fine particle composite and use thereof, as described below.

1. A composite of vapor grown carbon fiber and inorganic fine particles comprising vapor grown carbon fiber, each fiber filament of the carbon fiber having a structure with hollow space extending along its axis, a diameter of 0.001 to 1 μm and an aspect ratio of 5 to 15,000; and inorganic fine particles having a particle size of 0.0001 to 5 μm, the particles being deposited onto the surface of the carbon fiber, wherein the ratio of the average diameter of the vapor grown carbon fiber to the average particle size of the inorganic fine particles is 1:0.01 to 1:5.

2. The composite of vapor grown carbon fiber and inorganic fine particles according to 1 above, wherein the ratio by mass of the vapor grown carbon fiber to the inorganic fine particles is 1:0.005 to 1:50.

3. The composite of vapor grown carbon fiber and inorganic fine particles according to 1 or 2 above, wherein the inorganic fine particles are formed of an element belonging to groups 2 to 15 of the periodic table, or a compound containing the element.

4. The composite of vapor grown carbon fiber and inorganic fine particles according to 3 above, wherein the element belonging to groups 2 to 15 of the periodic table is magnesium, calcium, titanium, zirconium, vanadium, chromium, molybdenum, tungsten, manganese, iron, ruthenium, osmium, cobalt, rhodium, nickel, palladium, platinum, copper, silver, gold, zinc, cadmium, aluminum, gallium, indium, silicon, germanium, tin, phosphorus or bismuth.

5. The composite of vapor grown carbon fiber and inorganic fine particles according to 3 above, wherein the compound containing the element belonging to groups 2 to 15 of the periodic table is in the form of an oxide, a carbonate, a sulfate, a nitrate, a complex or a halide.

6. The composite of vapor grown carbon fiber and inorganic fine particles according to 3 above, wherein the compound containing the element belonging to groups 2 to 15 of the periodic table is in the form of an oxide.

7. The composite of vapor grown carbon fiber and inorganic fine particles according to 1 or 2 above, wherein the inorganic fine particles are formed of at least one species selected from the group consisting of silica, calcium carbonate, alumina, titanium oxide and iron oxide.

8. The composite of vapor grown carbon fiber and inorganic fine particles according to 1 above, wherein the vapor grown carbon fiber contains boron in an amount of 0.01 to 5 mass %.

9. A resin composite material comprising the composite of vapor grown carbon fiber and inorganic fine particles as recited in any of 1 to 8 above.

10. A paste comprising the composite of vapor grown carbon fiber and inorganic fine particles as recited in any of 1 to 8 above.

11. A catalyst comprising the composite of vapor grown carbon fiber and inorganic fine particles as recited in any of 1 to 8 above.

The composite of vapor grown carbon fiber and inorganic fine particles of the present invention will next be described in detail.

Each fiber filament of the vapor grown carbon fiber (hereinafter may be abbreviated as "VGCF" (registered trademark)) employed in the present invention has a hollow space extending along its axis, a diameter of 0.001 to 1 μm and an aspect ratio of 5 to 15,000. Preferably, the fiber filament has a diameter of 0.002 to 0.5 μm and an aspect ratio of 10 to 10,000.

Vapor grown carbon fiber can be produced through vapor-phase thermal decomposition of a gas such as hydrocarbon in the presence of a metallic catalyst.

For example, the following processes for producing VGCF are disclosed: a process in which an organic compound such as benzene, serving as a raw material, and an organo-transition metallic compound such as ferrocene, serving as a catalyst, are brought into a high-temperature reaction furnace together with a carrier gas, to thereby produce VGCF on a substrate (Japanese Laid-Open Patent Publication (kokai) No. 60-27700); a process in which VGCF (registered trademark) is produced in a dispersed state (Japanese Laid-Open Patent Publication (kokai) No. 60-54998); and a process in which VGCF is developed on a reaction furnace wall (Japanese Patent No. 2778434). VGCF produced through any of the above processes is thermally treated in an inert atmosphere (e.g., argon) at 600 to 1,500° C., and further thermally treated at 2,000 to 3,300° C., to thereby graphitize the VGCF.

Through the aforementioned processes, there can be produced carbon fiber of relatively a small diameter and high aspect ratio which exhibits excellent electrical conductivity and thermal conductivity, and is suitable for use as a filler material.

VGCF is characterized by its shape and crystal structure. The filament of VGCF has a structure including very thin hollow space in its center portion, and a plurality of carbon hexagonal network layers grown around the hollow space so as to form concentric cylinders in the form of growth rings.

The VGCF employed in the present invention may be, for example, branched, vapor grown carbon fiber disclosed in Japanese Laid-Open Patent Publication (kokai) No. 2002-266170, in which the portions having a structure with such hollow space are connected to one another.

The VGCF employed in the present invention may have an average fiber filament diameter of 80 to 500 nm, preferably 80 to 140 nm, more preferably 80 to 110 nm; have little variation in a fiber filament diameter, that is, 65% or more, preferably 70% or more, more preferably 75% or more of the total fiber (based on the number of fiber) falls within the range of ±20% of the average diameter. In addition, the VGCF employed in the present invention may have a bulk density of 0.015 g/cm³ or less and specific resistance of 0.015 Ω cm or less.

The aforementioned VGCF or branched VGCF can be produced by the thermal treatment according to the method disclosed in International Publication WO00/58536 pamphlet (boron treatment method) in an inert atmosphere (e.g., argon) at 2,000 to 3,300° C. in the presence of boron or a boron compound such as boric acid, a borate, boron oxide or boron carbide; or according to the method disclosed in Japanese Laid-Open Patent Publication (kokai) No. 2003-20527 (gas contact method); and vapor grown carbon fiber containing boron, or boron and a boron compound may be used in the present invention.

The inorganic fine particles employed in the present invention are formed of an elementary substance of an element belonging to groups 2 to 15 of the periodic table or a compound containing the element. Preferably, the inorganic fine particles are formed of an elementary substance of magnesium, calcium, titanium, zirconium, vanadium, chromium, molybdenum, tungsten, manganese, iron, ruthenium, osmium, cobalt, rhodium, nickel, palladium, platinum, copper, silver, gold, zinc, cadmium, aluminum, gallium, indium, silicon, germanium, tin, phosphorus, or bismuth, or a compound containing such an element. More preferably, the inorganic fine particles are formed of an elementary substance of magnesium, calcium, titanium, zirconium, vanadium, chromium, molybdenum, tungsten, iron, ruthenium, osmium, rhodium, palladium, platinum, copper, silver, gold, zinc, cadmium, aluminum, gallium, indium, silicon, germanium, tin, phosphorus or bismuth, or a compound containing such an element.

Examples of such a compound include an oxide, a carbonate, a sulfate, a nitrate, a complex and a halide. Among these, an oxide, a carbonate and a halide are preferred, with an oxide being particularly preferred. As used herein, the term "oxide" (i.e., compound formed of oxygen and an element other than oxygen) encompasses peroxides, superoxides, acidic oxides, basic oxides, amphoteric oxides, double oxides and oxyacid salts.

Specific examples of the oxide include silica, calcium carbonate, alumina, titanium oxide, iron oxide and barium titanate.

Through use of such an inorganic compound, the surface of the vapor grown carbon fiber can be modified so as to exhibit a characteristic such as hydrophilicity or hydrophobicity.

In the present invention, the ratio of the average particle size of the inorganic fine particles to the average diameter of the vapor grown carbon fiber is preferably 0.01:1 to 5:1, more preferably 0.01:1 to 3:1, much more preferably 0.1:1 to 1:1. When the ratio of the average particle size of the inorganic fine particles to the average diameter of the vapor grown carbon fiber is lower than 0.01:1, it causes difficulty in regulating the particle size of the inorganic fine particles, whereas when the ratio of the average particle size of the inorganic fine particles to the average diameter of the vapor grown carbon fiber is higher than 5:1, it becomes difficult to bond the inorganic fine particles to the surface of the vapor grown carbon fiber, and the effect of modifying the carbon fiber surface is reduced.

In the present invention, when the vapor grown carbon fiber and the inorganic fine particles are formed into a composite, the ratio by mass of the inorganic fine particles to the vapor grown carbon fiber is preferably 0.005:1 to 50:1, more preferably 0.01:1 to 40:1, much more preferably 0.05:1 to 30:1. When the ratio by mass of the inorganic fine particles to the vapor grown carbon fiber is lower than 0.005:1, the effect of modifying the surface of the carbon fiber is difficult to obtain, whereas when the ratio by mass of the inorganic fine particles to the vapor grown carbon fiber is higher than 50:1, it causes difficulty in bonding the fine particles to the surface of the carbon fiber, and the effect of modifying the carbon fiber surface is reduced.

The composite of vapor grown carbon fiber and inorganic fine particles of the present invention can be produced by means of the mechanochemical method in which the inorganic fine particles are physically (mechanically) deposited onto the surface of the vapor grown carbon fiber.

In the mechanochemical method, in principle, the inorganic fine particles and the vapor grown carbon fiber are dry-mixed together without use of a solvent while pressure and shear force are applied thereto, to thereby bond the carbon fiber and the particles to each other. The mechanochemical method employs substantially no solvent, and thus is advantageous in that it is not necessary to disperse the vapor grown carbon fiber and the inorganic fine particles in a solvent and to remove a solvent. Through use of the mechanochemical method, the inorganic fine particles can be deposited onto the vapor grown carbon fiber without disruption of carbon crystals constituting the carbon fiber and vapor grown carbon fiber, thereby improving surface characteristics of the carbon fiber.

INDUSTRIAL APPLICABILITY

In the composite of vapor grown carbon fiber and inorganic fine particles of the present invention, the surface of the vapor grown carbon fiber is modified by the inorganic fine particles without disruption of the carbon crystal structure of the carbon fiber. Therefore, the composite, which exhibits strength, electrical conductivity and thermal conductivity derived from the vapor grown carbon fiber, is useful as a material for a filler such as one employed in an electrically conductive resin, or an additive employed in a lead storage battery. Furthermore, when the vapor grown carbon fiber serves as a support for the inorganic fine particles, the support can utilize characteristics of the original carbon fiber (i.e., strength, electrical conductivity and thermal conductivity) without deterioration. Further, by adjusting the degree (amount) of depositing inorganic fine particles in the composite of vapor grown carbon fiber and inorganic fine particles contained in a resin composite material, the electric conductivity of the material may be adjusted.

BEST MODE FOR CARRYING OUT THE INVENTION

The present invention will next be described with reference to Examples. Vapor grown carbon fiber and inorganic fine particles employed in Examples are described below.

Vapor Grown Carbon Fiber:

Vapor grown carbon fiber (average diameter: 150 nm, average length: 20 μm) was produced using benzene and ferrocene (catalyst) by means of the method described in Japanese Patent No. 2778434. The thus-produced carbon fiber was thermally treated in an argon atmosphere at 1,000° C., and then subjected to graphitization treatment at 2,800° C. The resultant vapor grown carbon fiber was found to have an interlayer distance $C_0$ of 0.678 nm and a branching degree; i.e., an index showing the degree of bonding between fiber filaments, of 0.2 points/μm (the number of branching points per μm of a fiber filament as calculated through SEM image analysis).

Inorganic Fine Particles:
(1) Calcium carbonate: average primary particle size: 700 nm (product of Shiraishi Calcium Kaisha, Ltd., SECTAC-ARB HG)
(2) Alumina: average primary particle size: 30 nm (product of Showa Denko K.K., UFA-40)
(3) Titanium oxide: average primary particle size: 30 nm (product of Showa Denko K.K., SUPERTITANIA (registered trademark) F-4)

EXAMPLES 1 TO 6

Formation of Composites from Vapor Grown Carbon Fiber and Inorganic Fine Particles Vapor grown carbon fiber and calcium carbonate were mixed at a ratio (by mass) of 98:2, and the resultant mixture was subjected to mechanochemical treatment under the below-described conditions, to thereby form a vapor grown carbon fiber/calcium carbonate composite (2) (Example 1).

Calcium carbonate employed in Example 1 was replaced by alumina and titanium oxide respectively, to thereby form a vapor grown carbon fiber/alumina composite (2) (Example 2) and a vapor grown carbon fiber/titanium oxide composite (2) (Example 3).

Vapor grown carbon fiber and titanium oxide were mixed at a ratio (by mass) of 95:5, and the resultant mixture was subjected to the same mechanochemical treatment, to thereby form a vapor grown carbon fiber/titanium oxide composite (5) (Example 4).

Vapor grown carbon fiber and titanium oxide were mixed at a ratio (by mass) of 90:10, and the resultant mixture was subjected to the same mechanochemical treatment, to thereby form a vapor grown carbon fiber/titanium oxide composite (10) (Example 5).

Vapor grown carbon fiber having a bulk density of 0.012 g/cm$^3$, specific resistance of 0.007 Ω cm when compressed to the bulk density of 0.8 g/cm$^3$, fiber filament diameter of 97nm, standard deviation of fiber filament diameter of 23.4nm, and the average fiber filament length of 13 μm (average aspect ratio=130), wherein 75% of the total fiber (based on the number of fiber) falls within the range of ±20% of the average diameter was employed, to thereby form a vapor grown carbon fiber/titanium oxide composite (2) (Example 6) similar to the composite of Example 3.

Mechanochemical Treatment Conditions:
Apparatus employed: MICROS-O model, product of Nara Machinery Co., Ltd.
Capacity: 0.75 L
Effective capacity: 0.45 L
Treatment amount: 20 g
Main shaft rotation speed: 1,800 rpm
Treatment time: 90 minutes

EXAMPLES 7 TO 13 AND COMPARATIVE EXAMPLES 1 TO 6

Resin Composite Material Containing Vapor Grown Carbon Fiber/Inorganic Fine Particle Composite By means of the below-described method, each of the composites of vapor grown carbon fiber and inorganic fine particle formed in Examples 1 through 6 was mixed with a resin (nylon 66, hereinafter abbreviated as "PA"), to thereby evaluate the dispersibility of the resultant composite in the resin composite material. Dispersibility of the composite was evaluated by measuring the electrical conductivity of the resin composite material. CM3001 (product of Toray Industries, Inc.) was employed as PA.

Formation of PA Composite Material:
PA (74 g in Examples 7 to 11 and 13, 70 g in Example 12) and the vapor grown carbon fiber/inorganic fine particle composite (4 g in Examples 7 to 11 and 13, 8 g in Example 12) were melt-mixed by use of Labo Plastomill (Toyo Seiki) at 270° C. and 40 rpm for 10 minutes. The resultant PA composite material was formed into a plate having dimensions of 100 mm×100 mm×2 mm by applying thermal pressure (280° C., 20 MPa (200 kgf/cm$^2$), 30 seconds). The thus-formed plate was employed as a sample. For comparison, the following samples were prepared: a sample prepared from a composite material of PA and vapor grown carbon fiber having no inorganic fine particles deposited thereto; a sample prepared from a mixture of PA (74 g) and vapor grown carbon fiber (3.9 g)/calcium carbonate (0.08 g); and a sample prepared from merely PA.

The electrical conductivity of each of the samples was measured by use of a four-probe measuring apparatus and an insulation resistance meter. Table 1 shows the results of measured resistance and strength (JIS K7194).

TABLE 1

|  |  | Filler | Filler content in resin (mass %) | Resistance ($\Omega \cdot cm$) | Strength (MPa) |
|---|---|---|---|---|---|
| Examples | 7 | Vapor grown carbon fiber/calcium carbonate composite (2) | 5 | $1 \times 10^8$ | 110 |
|  | 8 | Vapor grown carbon fiber/alumina composite (2) | 5 | $3 \times 10^6$ | 100 |
|  | 9 | Vapor grown carbon fiber/titanium oxide composite (2) | 5 | $5 \times 10^6$ | 110 |
|  | 10 | Vapor grown carbon fiber/titanium oxide composite (5) | 5 | $1 \times 10^4$ | 105 |
|  | 11 | Vapor grown carbon fiber/titanium oxide composite (10) | 5 | $6 \times 10^6$ | 98 |
|  | 12 | Vapor grown carbon fiber/titanium oxide composite (10) | 10 | $3 \times 10^3$ | 100 |
|  | 13 | Vapor grown carbon fiber/titanium oxide composite (2) | 5 | $3 \times 10^3$ | 108 |
| Comparative Examples | 1 | Vapor grown carbon fiber | 5 | $5 \times 10^{12}$ | 85 |
|  | 2 | Vapor grown carbon fiber | 10 | $2 \times 10^4$ | 90 |
|  | 3 | Vapor grown carbon fiber | 15 | $3 \times 10^3$ | 98 |
|  | 4 | Air-oxidized vapor grown carbon fiber (oxidized carbon fiber content: 85 mass %) | 5 | $5 \times 10^8$ | 75 |
|  | 5 | Vapor grown carbon fiber/calcium carbonate mixture | 5 | $5 \times 10^{12}$ | 70 |
|  | 6 | None | 0 | $9 \times 10^{16}$ | 70 |

As seen from Table 1, the composite of vapor grown carbon fiber and inorganic fine particle, in which the inorganic fine particles are deposited onto the surface of the vapor grown carbon fiber, exhibited improved wettability to the resin. Comparison between the resin composite material formed from the composite and the resin composite material formed from the vapor grown carbon fiber having no inorganic fine particles deposited thereto, which composite materials were formed under the same conditions, revealed that the former composite material exhibits higher electrical conductivity.

EXAMPLE 14 AND COMPARATIVE EXAMPLE 7

Paste Containing a Composite of Vapor Grown Carbon Fiber and Inorganic Fine Particles The vapor grown carbon fiber/alumina composite (2) (Example 14) (10 mass %: dried paste basis) was kneaded with a xylene-modified phenoxy resin and glycol ether serving as a solvent by use of a three-roll mill, to thereby prepare an electrically conductive paste. For comparison, the composite (2) was replaced by vapor grown carbon fiber having no inorganic fine particles deposited thereto (Comparative Example 7), and an electrically conductive paste was prepared in the same manner as described above.

By use of each of the thus-prepared pastes, patterns (n=5) were printed on an epoxy substrate by means of screen printing, and then dry-cured at 200° C. After completion of dry-curing, the patterns were found to have a thickness of 10 μm.

The surface resistances of the patterns formed of the above pastes were found to be 200 Ω/□ (Example 14) and 400 Ω/□ (Comparative Example 7), respectively. The results reveal that when used in pastes (coating film) under the same conditions, the composite of the present invention, in which the inorganic fine particles are deposited onto the surface of the vapor grown carbon fiber, exhibits improved wettability to the resin and higher electrical conductivity, as compared with the vapor grown carbon fiber having no inorganic fine particles deposited thereto.

EXAMPLE 15

Catalyst Containing a Vapor Grown Carbon Fiber/Inorganic Fine Particle Composite In a manner similar to that of Example 1, vapor grown carbon fiber and iron oxide (product of Wako Pure Chemical Industries, Ltd., average primary particle size: 300 nm) were mixed at a ratio (by mass) of 95:5, to thereby form a composite. The thus-formed vapor grown carbon fiber/iron oxide (5) composite (1 g) was placed on an alumina board, and then the alumina board was placed at the center portion of a reaction furnace having a horizontally-disposed quartz tube (inner diameter: 20 mm, length: 600 mm), followed by reduction treatment in a hydrogen atmosphere at 900° C. for 60 minutes. Analysis of the vapor grown carbon fiber/iron oxide (5) composite by use of an X-ray diffraction apparatus did not indicate a peak corresponding to iron oxide but indicated a peak corresponding to iron. The resultant vapor grown carbon fiber/iron composite (0.1 g) was placed on an alumina board, and the alumina board was placed in the aforementioned reaction furnace. The temperature of the reaction furnace was raised to 1,150° C., and hydrogen (100 ml/min) and benzene (1 ml/min) were fed to the furnace, to thereby allow reaction to proceed for 20 minutes. After the reaction furnace was cooled, a large amount of a web-like vapor grown carbon fiber product (fiber diameter: 200 nm, aspect ratio: 50, average interlayer distance $C_0$:0.69 nm) was found to be produced around the vapor grown carbon fiber/iron composite.

The results revealed that the vapor grown carbon fiber/iron composite serves as a catalyst for the production of vapor grown carbon fiber from benzene.

The invention claimed is:

1. A composite of vapor grown carbon fiber and inorganic fine particles comprising vapor grown carbon fiber, each fiber filament of the carbon fiber having a structure with hollow space extending along its axis, a diameter of 0.001 to 1 μm and an aspect ratio of 5 to 15,000; and inorganic fine particles having a particle size of 0.0001 to 5 μm, the particles being deposited onto the surface of the carbon fiber by a mechanochemical mixing, in the absence of a resin, wherein the ratio of the average diameter of the vapor grown carbon fiber to the average particle size of the inorganic fine particles is 1:0.01 to 1:5 and the ratio by mass of the vapor grown carbon fiber to the inorganic fine particles is 98:2 to 90:10.

2. The composite of vapor grown carbon fiber and inorganic fine particles according to claim 1, wherein the inorganic fine particles are formed of an element belonging to groups 2 to 15 of the periodic table, or a compound containing the element.

3. The composite of vapor grown carbon fiber and inorganic fine particles according to claim 2, wherein the element belonging to groups 2 to 15 of the periodic table is magnesium, calcium, titanium, zirconium, vanadium, chromium, molybdenum, tungsten, manganese, iron, ruthenium, osmium, cobalt, rhodium, nickel, palladium, platinum, copper, silver, gold, zinc, cadmium, aluminum, gallium, indium, silicon, germanium, tin, phosphorus or bismuth.

4. The composite of vapor grown carbon fiber and inorganic fine particles according to claim 2, wherein the compound containing the element belonging to groups 2 to 15 of the periodic table is in the form of an oxide, a carbonate, a sulfate, a nitrate, a complex or a halide.

5. The composite of vapor grown carbon fiber and inorganic fine particles according to claim 2, wherein the compound containing the element belonging to groups 2 to 15 of the periodic table is in the form of an oxide.

6. The composite of vapor grown carbon fiber and inorganic fine particles according to claim 1, wherein the inorganic fine particles are formed of at least one species selected from the group consisting of silica, calcium carbonate, alumina, titanium oxide and iron oxide.

7. The composite of vapor grown carbon fiber and inorganic fine particles according to claim 1, wherein the vapor grown carbon fiber contains boron in an amount of 0.01 to 5 mass%.

8. A resin composite material comprising a resin and the composite of vapor grown carbon fiber and inorganic fine particles as recited in claim 1 as a filler.

9. A method for producing a composite of vapor grown carbon fiber and inorganic fine particles, wherein inorganic fine particles are deposited onto the surface of a vapor-grown carbon fiber by mixing, in the absence of a resin, vapor grown carbon fiber, each fiber filament of the carbon fiber having a structure with hollow space extending along its axis, a diameter of 0.001 to 1 μm and an aspect ratio of 5 to 15,000; and inorganic fine particles having a particle size of 0.0001 to 5μm by a mechanochemical method, the particles being deposited onto the surface of the carbon fiber, wherein the ratio of the average diameter of the vapor grown carbon fiber to the average particle size of the inorganic fine particles is 1:0.01 to 1:5 and the ratio by mass of the vapor grown carbon fiber to the inorganic fine particles is 98:2 to 90:10.

10. The method for producing a composite of vapor grown carbon fiber and inorganic fine particles according to claim 9, wherein the inorganic fine particles are formed of an element belonging to groups 2 to 15 of the periodic table, or a compound containing the element.

11. The method for producing a composite of vapor grown carbon fiber and inorganic fine particles according to claim 10, wherein the element belonging to groups 2 to 15 of the periodic table is magnesium, calcium, titanium, zirconium, vanadium, chromium, molybdenum, tungsten, manganese, iron, ruthenium, osmium, cobalt, rhodium, nickel, palladium, platinum, copper, silver, gold, zinc, cadmium, aluminum, gallium, indium, silicon, germanium, tin, phosphorus or bismuth.

12. The method for producing a composite of vapor grown carbon fiber and inorganic fine particles according to claim 10, wherein the compound containing the element belonging to groups 2 to 15 of the periodic table is in the form of an oxide, a carbonate, a sulfate, a nitrate, a complex or a halide.

13. The method for producing a composite of vapor grown carbon fiber and inorganic fine particles according to claim 10, wherein the compound containing the element belonging to groups 2 to 15 of the periodic table is in the form of an oxide.

14. The method for producing a composite of vapor grown carbon fiber and inorganic fine particles according to claim 9, wherein the inorganic fine particles are formed of at least one species selected from the group consisting of silica, calcium carbonate, alumina, titanium oxide and iron oxide.

15. The method for producing a composite of vapor grown carbon fiber and inorganic fine particles according to claim 9, wherein the vapor grown carbon fiber contains boron in an amount of 0.01 to 5 mass%.

* * * * *